(12) United States Patent
Fischer et al.

(10) Patent No.: US 8,670,427 B2
(45) Date of Patent: *Mar. 11, 2014

(54) NETWORK TIME RESERVATION CANCELLATION

(71) Applicant: Broadcom Corporation, Irvine, CA (US)

(72) Inventors: Matthew J. Fischer, Mountain View, CA (US); Bruce E. Edwards, Belmont, MA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,763

(22) Filed: May 13, 2013

(65) Prior Publication Data

US 2013/0242961 A1  Sep. 19, 2013

Related U.S. Application Data

(63) Continuation of application No. 13/165,295, filed on Jun. 21, 2011, now Pat. No. 8,446,889, which is a continuation of application No. 11/141,759, filed on Jun. 1, 2005, now Pat. No. 7,965,691.

(60) Provisional application No. 60/757,950, filed on Jun. 1, 2004.

(51) Int. Cl.
*H04W 4/00* (2009.01)
*H04H 20/67* (2008.01)

(52) U.S. Cl.
USPC .......................................... 370/338; 370/339

(58) Field of Classification Search
USPC ................................................ 370/338, 339
See application file for complete search history.

(56) References Cited

U.S. PATENT DOCUMENTS

| | | | |
|---|---|---|---|
| 7,471,640 B2 | 12/2008 | Huang et al. | |
| 7,489,688 B2 | 2/2009 | Giesberts et al. | |
| 7,554,966 B2 | 6/2009 | Edwards et al. | |
| 7,881,278 B2 | 2/2011 | Edwards et al. | |
| 7,965,691 B2 * | 6/2011 | Fischer et al. | 370/338 |
| 8,446,889 B2 * | 5/2013 | Fischer et al. | 370/338 |
| 2002/0090022 A1 | 7/2002 | Yano et al. | |
| 2003/0093526 A1 | 5/2003 | Nandagopalan et al. | |
| 2005/0018638 A1 | 1/2005 | Lindskog et al. | |
| 2005/0068895 A1 | 3/2005 | Stephens et al. | |
| 2005/0135318 A1 | 6/2005 | Walton et al. | |
| 2005/0190724 A1 | 9/2005 | Hansen et al. | |
| 2005/0237992 A1 | 10/2005 | Mishra et al. | |
| 2005/0249244 A1 | 11/2005 | McNamara et al. | |
| 2005/0265393 A1 | 12/2005 | Fischer et al. | |
| 2009/0262721 A1 | 10/2009 | Edwards et al. | |

FOREIGN PATENT DOCUMENTS

WO  WO 03/048913 A1  6/2003

* cited by examiner

*Primary Examiner* — Mark Rinehart
*Assistant Examiner* — Gbemileke Onamuti
(74) *Attorney, Agent, or Firm* — Garlick & Markison; Bruce E. Garlick

(57) ABSTRACT

Methods and systems that support, for example, canceling or trimming reservations of a shared communication medium are described. In one embodiment, a method that adapts a network time reservation in a communication network may include, for example, one or more of the following: transmitting a preamble field; transmitting a legacy signal field; transmitting at least one paired field, each paired field comprising a signal field and a protocol data unit; and generating an interframe gap.

20 Claims, 5 Drawing Sheets

NETWORK TIME RESERVATION CANCELLATION

CROSS REFERENCE TO RELATED PATENTS/PATENT APPLICATIONS

The present U.S. Utility Patent Application claims priority pursuant to 35 U.S.C. §120, as a continuation of U.S. Utility application Ser. No. 13/165,295 filed Jun. 21, 2011, now issued as U.S. Pat. No. 8,446,889, which claims priority pursuant to 35 U.S.C. §120, as a continuation of U.S. Utility application Ser. No. 11/141,759, entitled "Network Time Reservation Cancellation," filed Jun. 1, 2005, now U.S. Pat. No. 7,965,691, which claims benefit from U.S. Provisional Application Ser. No. 60/575,950, filed Jun. 1, 2004, now expired, all of which are incorporated herein by reference in their entirety for all purposes.

INCORPORATION BY REFERENCE

The above-referenced United States patent applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In wireless local area networks (LANs), a network time reservation mechanism is employed to prevent medium access contention that might otherwise arise due to the inability of all nodes in the network to properly detect the presence of transmissions from all other nodes within the network. This problem is commonly known as the hidden node problem. In the hidden node situation, a hidden node is unable to receive some or all of the transmission from another node. Thus, the hidden node may incorrectly perceive the network as being in an idle state, when, in fact, the network may be busy. Hidden nodes can be caused by a variety of mechanisms including, for example, distance, presence of interference sources, partial rate/modulation incompatibility, noise and other mechanisms. When a hidden node incorrectly determines that the network is idle, the hidden node might attempt its own transmission, thereby causing a collision. While collisions are a natural, acceptable part of some networks, arising naturally in some methods for arbitrating access to the network, collisions are generally not expected to occur once the arbitration phase of network access has ended. In this regard, hidden nodes and the potential for collisions that hidden nodes introduce are detrimental to the most efficient operation of the network. To avoid hidden node collisions and the network efficiency losses created by hidden node collisions, various schemes have been introduced including a network reservation mechanism.

However, it may not always be possible to predict, at the time the reservation is requested, the amount of time required to complete the full set of frame transmissions and/or exchanges. The time can be variable due to many factors including, for example, incomplete knowledge relating to the number of frames available for transmission in the sequence when the sequence is initiated (e.g., the availability of frames for transmission may change during the transmission), incomplete knowledge relating to the specific characteristics of the frames that will be transmitted during the sequence (e.g., rate and frame lengths), and possible retransmission overhead (e.g., in case of transmission failures). Because of the possible lack of ability to predict the expected duration of the upcoming extended sequence of frame transmissions and/or frame exchanges, the initial reservation may be made with a conservative value (i.e., inclusive of some time beyond that which might be otherwise necessary), or possibly be made with a fixed value, in the case when very little knowledge is known about the number and length of frames that could be included in the sequence. Such a reservation mechanism may, in all likelihood, include more time than necessary to complete the transmission sequence, resulting in a loss of efficiency in the use of the communication medium.

Further limitations and disadvantages of conventional and traditional approaches will become apparent to one of ordinary skill in the art through the comparison of such systems and methods with at least some aspects of present invention as set forth in the remainder of the present application with reference to the drawings.

BRIEF SUMMARY OF THE INVENTION

Some embodiments according to some aspects of the present invention may relate to the exchange of frames of information (e.g., digital information) using a shared communication medium.

Some embodiments according to some aspects of the present invention may provide for canceling and/or trimming a medium reservation in a communication system that employs a protocol that supports a reservation of a shared communication medium.

Some embodiments according to some aspects of the present invention may provide for communicating multiple frames of data in a single medium access.

The above-mentioned embodiments and/or some other embodiments according to some aspects of the present invention may be provided, substantially as shown in at least one of the figures and/or as described in the specification, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Some embodiments according to some aspects of the present invention relate to the exchange of frames of information (e.g., digital information) using a shared communication medium.

Some embodiments according to some aspects of the present invention provide for canceling and/or trimming a medium reservation in a communication system that employs a protocol that supports a reservation of a shared communication medium.

Although some references may be made herein with respect to a particular protocol (e.g., a particular wireless communication protocol), it is understood that some embodiments according to some aspects of the present invention are not limited to using the exemplary protocol standards discussed herein. Some embodiments according to some aspects of the present invention may find application, for example, with other communication techniques or with other types of protocols (e.g., other types of communication protocols).

Some embodiments according to some aspects of the present invention provide a network reservation mechanism that includes, for example, the exchange of a request for a period of network time in which data can be safely exchanged. The request may be followed by the transmission of a confirmation of the reservation if the reservation is successful. If the reservation is not successful, then no confirmation may be received. Because of the transmission of the confirmation, some of the hidden nodes (e.g., those nodes that were unable to hear the request for the reservation) may be informed of the upcoming transmission, through their reception of the reservation confirmation. During the reserved time period, the non-participating nodes may not be allowed to make any transmission attempts, thereby reserving the time for the transmission by the originally requesting node.

Some embodiments according to some aspects of the present invention provide that the reservation time may be used for an extended sequence of frame transmissions and/or frame exchanges. A method and a system that exchanges multiple frames in a single medium access may be found, for example, in U.S. Provisional Patent Application Ser. No. 60/574,109, entitled "Method of Combining Multiple Frames of Data into a Single Medium Access", filed on May 25, 2004, and in U.S. patent application Ser. No. 11/137,689, entitled "Method for Combining Multiple Frames of Data into a Single Medium Access," filed on May 25, 2005. The above-referenced applications are hereby incorporated herein by reference in their entirety.

Figure 1:
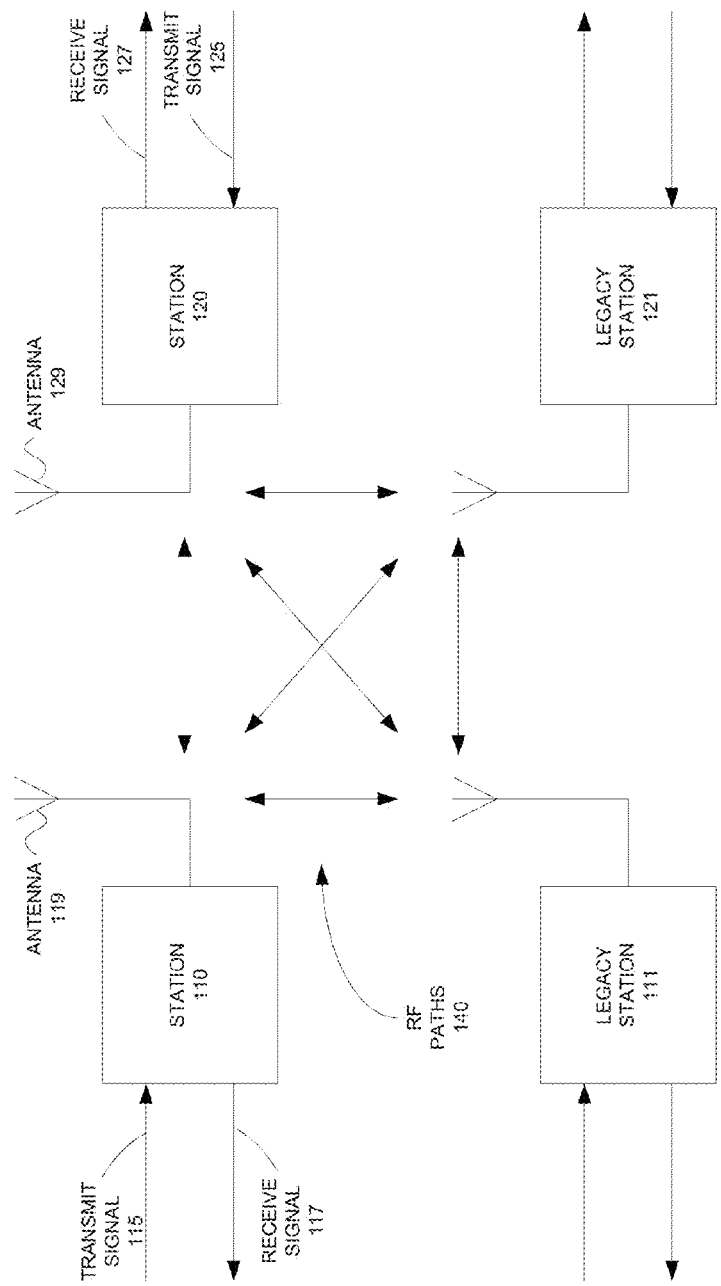
FIG. 1 shows a block diagram illustrating an embodiment of a wireless data communication system according to some aspects of the present invention.

FIG. 1 shows a block diagram illustrating an embodiment of a wireless data communication system 100 according to some aspects of the present invention. The communication system 100 may include, for example, a first station 110, a first legacy station 111, a second station 120 and a second legacy station 121 in wireless communication. In some embodiments according to some aspects of the present invention, at least a subset of the first station 110, the first legacy station 111, the second station 120, the second legacy station 121 are in radio frequency (RF) communication via respective antennas over, for example, a shared RF communication medium 140. For example, the first station 110 and the second station 120 are in radio frequency (RF) communication via a first antenna 119 and a second antenna 129, respectively. The RF communication may occur, for example, over a shared RF communication medium 140. The station 110, 120 may convert, for example, transmit signals 115, 125 into RF signals to be received by the other station 110, 120. The station 110, 120 may convert, for example, the received RF signals into receive signals 117, 127. Although four stations are illustrated in FIG. 1, some embodiments according to some aspects of the present invention contemplate more or less than four stations. In addition, although the antenna 119, 129 is shown as a single antenna coupled to a respective station 110, 120, some embodiments according to some aspects of the present invention provide that the antenna 119, 120 may comprise one or more antennas. In some embodiments according to some aspects of the present invention, multiple antennas may be used for each of the antennas 119, 120 to support, for example, diversity, beamforming, space-time coded systems or other types of multiple-antenna systems. The accuracy of the communication of the transmit signal 115 of the station 110 to another station 120 as the receive signal 127 and the accuracy of the communication of the transmit signal 125 of the station 120 to another station 110 as the receive signal 117 may depend upon, for example, one or more of the following factors: a length of the shared RF communication medium 140 between the stations 110, 120; a power level of the RF signal transmitted by the stations 110, 120; one or more sources of interference along the shared RF communication medium 140; a gain provided by antennas 119, 129; and one or more factors already known by one of ordinary skill in the art.

In some embodiments according to some aspects of the present invention, the stations 110, 120 are capable of understanding a particular burst format while the legacy stations 111, 121 may not be capable of understanding the particular burst format.

To communicate data over the shared RF communication medium 140, the stations 110, 120 may employ, for example, a communication protocol. The communication protocol may package, for example, segments of the data to be communicated into frames. The communication protocol may provide that additional information be transmitted for use in, for example, medium access control, error control, and/or control signaling.

Figure 2:
FIG. 2 illustrates at least some of the fields in an embodiment of a protocol frame format for use with a shared medium according to some aspects of the present invention.

FIG. 2 illustrates some of the fields in an embodiment of a protocol frame format 200 for use with a shared medium according to some aspects of the present invention. The protocol frame format 200 may be similar to or based on, for example, a wireless data protocol as set forth in, for example, IEEE 802.11a or some other protocol. The protocol frame format 200 may correspond, for example, to the format used for the transmit signals 115, 127 and/or the receive signals 117, 125. To provide an illustrative example, some of the discussions herein relating to some embodiments according to some aspects of the present invention may reference some elements of the IEEE 802.11 a physical frame format. Some embodiments of techniques discussed herein may be used, for example, in IEEE 802.11 networks according to some aspects of the present invention. Some embodiments of techniques discussed herein may be used, for example, in applications in which the frames of a communication protocol have the same basic structure as that described herein according to some aspects of the present invention. The protocol frame format 200 is therefore shown for merely illustrative purposes. Other protocols for use over a shared communication medium including, for example, wireless and/or wired communication media protocols are also contemplated by some embodiments according to some aspects of the present invention. The present invention is not limited to use with a wireless communication medium and may be applied, for example, to other communication media without departing from the spirit and scope of the present invention.

In IEEE 802.11a, a physical layer convergence protocol (PLCP) data unit (PPDU) may include, for example, a PLCP header and a PLCP Service Data Unit (PSDU). Physical layer convergence protocol may also be the same as physical layer convergence procedure. Thus, PLCP may stand for either physical layer convergence protocol or physical layer convergence procedure. The PLCP header may carry, for example, information relating to a method of transmission. The PLCP header may include, for example, information relating to one or more of the following: an encoding method, a length and initialization information for a receiver. The encoding information and length information may be part of, for example, a Signal field 220 of the PLCP header. The initialization information may be part of, for example, a Service field 230 of the PLCP header. The PPDU may be transmitted, for example, by obtaining access to a communication medium and by transmitting a sequence of bits in a Preamble field 210. The Preamble field 210 may be followed, for example, by one or more symbols (e.g., a single symbol) that encode the Signal field 220 of the PLCP header. The one or more symbols may be transmitted in a particular robust encoding format. The Signal field 220 symbol may be followed, for example, by a plurality (e.g., a sequence) of symbols that encode the Service field 230 of the PLCP header and the PSDU 230.

Because the wireless medium is a shared medium, each station may attempt to decode the transmitted frames received by that station. A station may use the Preamble field 210, for example, to synchronize its data recovery circuit and/or to determine the channel characteristics between the transmitter and the station. The receiving station may decode the Signal field 220 symbol and may use it to determine a time duration of the transmission to follow. In IEEE 802.11a, a station may use the detection of the Preamble 210 and the information decoded from the Signal field 220 to determine the length of the physical-layer based (e.g., signal-field based) reservation of the shared communication medium 140. The length of the reservation may then determine when the shared communication medium 140 may become available for transmission according to the physical-layer based (e.g., signal field based) reservation mechanism.

As illustrated in FIG. 2, to support the use of the communication medium, the protocol frame format 200 may include, for example, a number of portions or fields as set forth above including, for example, one or more of the following: the Preamble field 210, the Signal field 220, the Service/PSDU field 230 and an Interframe Gap 240, which may also be referred to as an interframe space. Some embodiments according to some aspects of the present invention may provide that the Interframe Gap 240 is not part of the protocol frame format 200, but instead occurs after, for example, a protocol data unit. Some embodiments according to some aspects of the present invention may provide that the Interframe Gap 240 is a gap of zero time. Although the Interframe Gap 240 might not contain data, the Interframe Gap 240 may be employed by the stations 110, 120 during communication via the shared communication medium. In order for the communication medium to be shared by a variety of stations 110, 120, portions of the protocol frame format 200 may be transmitted, for example, at a predefined rate. In some embodiments according to some aspects of the present invention, the Preamble field 210, the Signal field 220 and the Interframe Gap 240 may be predefined and may be transmitted at a particular data rate (e.g., a known data rate) so as to be receivable by a variety of receivers. The fields may be of a fixed duration. Other portions or fields of the protocol frame format 200 such as, for example, the Service/PSDU field 230, which can be used to carry payload or data, may be transmitted at a different data rate depending upon, for example, the capabilities of the intended recipient. Through the use of, for example, a predefined format and data rate for certain protocol frame elements or fields, the stations 110, 120 in the wireless data communication system 100 may be aware of the operational details of the shared communication medium so as to open it the stations 110, 120 to access and to utilize the communication medium.

Because particular portions or fields such as, for example, the Preamble field 210, the Signal field 220 and the Interframe Gap field 240 of the protocol frame format 200 are of fixed durations, attempts to increase the throughput of the communication medium may be hampered at times. In some circumstances; as the data transmission rate over the shared communication medium 140 increases, the Service/PSDU field 230 information, for example, shrinks in duration, while the time for the portions or fields of fixed durations (e.g., the Preamble field 210, the Signal field 220, and Interframe Gap portion 240) remains the same. Thus, under some circumstances, a reduction in protocol efficiency occurs, for example, as the data rate used for the Service/PSDU field 230 increases.

To increase the throughput of a network using a protocol frame format similar to the protocol frame format as illustrated in FIG. 2, it may be desirable to amortize the overhead of the Preamble field 210 and Interframe Gap portion 240 over a plurality of frames (e.g., over as many frames being transmitted as possible). If the transmission medium is very busy or if the transmitted data rates are high, then some embodiments according to some aspects of the present invention provide that a station accumulate a number of frames before it obtains access to the medium. If the station accumulates a number of frames, then some embodiments according to some aspects of the present invention provide a transmission format that supports the combination of multiple frames of information into a single medium access. In some cases, this may increase network efficiency.

Figure 3:
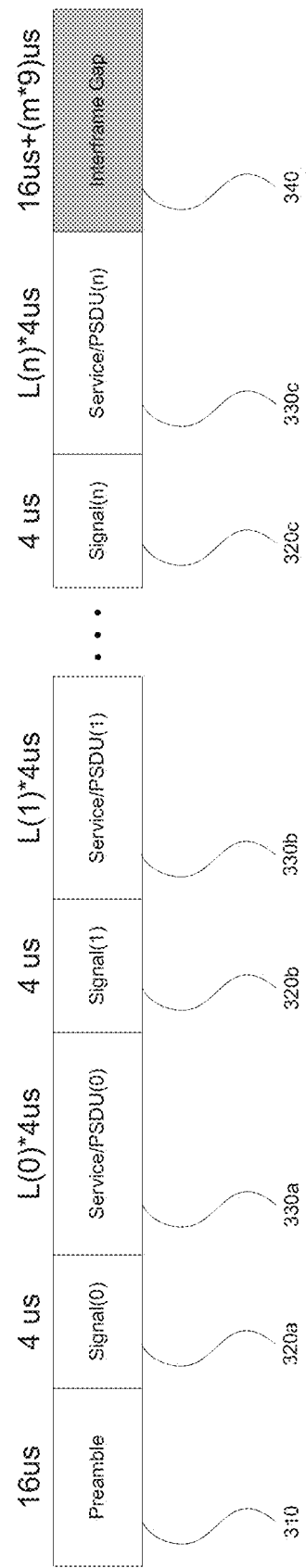
FIG. 3 illustrates an embodiment of a burst transmission format according to some aspects of the present invention.

FIG. 3 illustrates an embodiment of a compact burst transmission format according to some aspects of the present invention. In some embodiments according to some aspects of the present invention, the compact burst transmission format 300 may include, for example, a Preamble field 310 (e.g., a single Preamble field); at least one Signal and Service/PSDU field pair such as, for example, a plurality of Signal and Service/PSDU field pairs (320a, 330a), (320b, 330b), (320c, 330c); and an Interframe Gap field 340 (e.g., a single Interframe Gap field). The Signal fields 320a-c (e.g., all of the Signal fields) in the compact burst transmission format 300 may be transmitted in a robust transmission format and rate (e.g., the most robust transmission format and rate). Using a robust transmission format and rate may increase the likelihood that the information in the Signal fields 320a-c is received correctly by all stations capable of receiving the transmissions from the station 110, 120 that is currently transmitting. Each Signal field 320a-c may indicate, for example, the duration of the respective Service/PSDU 330a-c portion of the compact burst transmission format 300, thereby permitting a receiver to determine the time reserved for the transmission of the compact burst transmission format 300 using a shared communication medium such as, for example, the shared RF communication medium 140. In some embodiments of the compact burst transmission format 300 according to some aspects of the present invention, each Service/PSDU field 330a-c may be encoded differently. Different encodings may achieve, for example, a minimum transmission time and acceptable error rates at the intended receiving station 110, 120. The stations 110, 120 (e.g., all or some stations) may attempt to decode the entire compact burst transmission. However, due to random transmission errors, varying signal strength, and varying encoding formats, for example, a particular station 110, 120 may not correctly receive a particular Service/PSDU 330a-c. The incorrect reception of a single Service/PSDU 330a-c in the burst, however, does not necessarily affect adversely the ability of that station to receive the next Signal and Service/PSDU pair in the burst.

Figure 4:
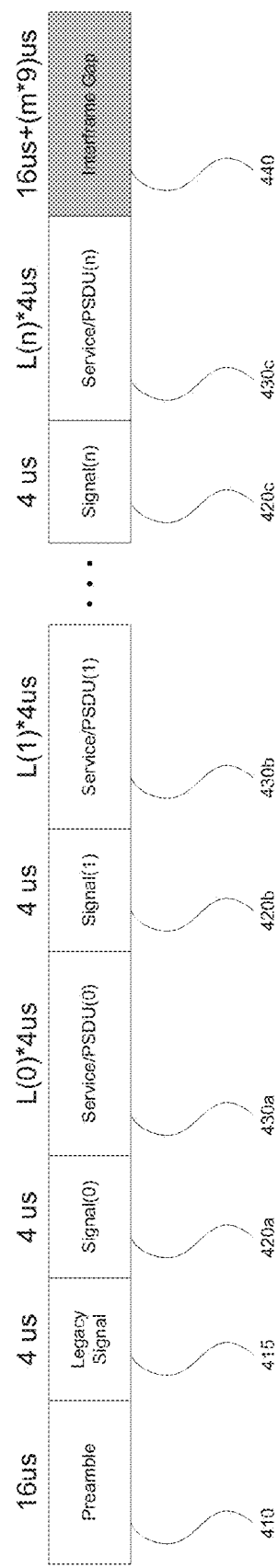
FIG. 4 shows an embodiment of a burst transmission format according to some aspects of the present invention.

FIG. 4 shows an embodiment of a backwards-compatible burst transmission format 400 according to some aspects of the present invention. In some circumstances, it may be desirable to interoperate with stations (e.g., legacy stations 111, 121) which do not understand the format of compact bursts such as, for example, the compact burst transmission format 300. The use of a backwards-compatible burst transmission format such as, for example, the backwards-compatible burst transmission format 400 illustrated in FIG. 4, may enable legacy stations 111, 121 (e.g., those stations which are unable to understand the compact burst transmission format 300) to determine the medium usage of transmissions 10 using the compact burst transmission format 300. Some embodiments according to some aspects of the present invention provide that the backwards-compatible burst transmission format 400 may be similar (e.g., almost identical) to the compact burst transmission format 300. However, the backwards-compatible burst transmission format 400 may provide, for example, a Legacy Signal field 415. In some embodiments according to some aspects of the present invention, the Legacy Signal field 415 may be added after the Preamble field 410 (e.g., immediately after the Preamble field 410). The Legacy Signal field 415 may be decoded by, for example, legacy receivers (e.g., some legacy receivers) and/or receivers that support, for example, the compact burst transmission format 300. The Legacy Signal field 415 may be adapted, for example, to specify the time duration of the entire backwards compatible burst transmission format 400.

When a backwards-compatible burst is received at a legacy station such as, for example, an embodiment of the station I11, 121 according to some aspects of the present invention, the Legacy Signal field 415 may be decoded by the receiver portion and may specify, for example, the duration of the entire backwards-compatible burst. The legacy station 111, 121 may interpret the backwards-compatible burst 400 as a single large frame. Accordingly, the legacy station 111, 121 may not attempt to use the medium at any time during the backwards-compatible burst 400. After the end of the backwards-compatible burst 400, a legacy station I11, 121 may then contend for the medium using its normal contention mechanisms.

When a backwards-compatible burst 400 is received at a backwards-compatible, burst-capable station such as, for example, an embodiment of the station 110, 120 according to some aspects of the present invention, the backwards-compatible burst-capable station 110, 120 may decode the Legacy Signal field 415 and may store the expected burst duration. The backwards-compatible burst-capable station then may continue to decode the Signal and Service/PSDU pairs (420a, 430a), (420b, 430b), (420c, 430c) as in the compact burst example described above with respect to FIG. 3. If any of the Signal fields 420a-c is decoded incorrectly, then the station may not contend for the communication medium until, for example, the time specified in the Legacy Signal field 415 has elapsed.

Some embodiments according to some aspects of the present invention provide a mechanism that cancels, for example, the remaining portion of a confirmed reservation of a shared communication medium. In some embodiments according to some aspects of the present invention, the confirmed reservation includes one or more reservations of the shared communication medium (e.g., one or more reservations of the shared communication medium as described above, for example, with respect to FIG. 3, FIG. 4, the POU-based reservation mechanism and/or the Signal-field-based reservation mechanism).

In some embodiments according to some aspects of the present invention, canceling of the remaining reservation time may be accomplished by sending a specific frame that indicates to the receivers, which have noted the existing reservation, that the remaining reservation time shall be cancelled. The reservation may be created when a request or sends a reservation requesting frame to another network node. For example, in a wireless local area network (LAN), a reservation requesting frame may be sent to an access point (AP). If the reservation request frame (e.g., a network reservation request frame) is properly received, then the network node to which the reservation is addressed may send a reservation confirmation frame back to the reservation requesting node (provided that no other rule otherwise prevents the reservation from being made). In one embodiment of a reservation request mechanism according to some aspects of the present invention, the IEEE 802.11 protocol provides that the reservation request frame may include, for example, a request-to send (RTS) frame.

In some embodiments according to some aspects of the present invention, the node (e.g., the owner of the reservation) that sent the original reservation request and completed its sequence of frame transmissions and/or exchanges may request that the node that sent the reservation confirmation, or another node, send a message (e.g., a cancellation request indication). The cancellation request may cause the nodes that receive the message to cancel any remaining reservation. In some embodiments according to some aspects of the present invention, the receiving nodes may cancel the remaining reservation upon receipt of the cancellation request indication. In some embodiments according to some aspects of the present invention, the node that sent the reservation request and completed its sequence of frame transmissions and/or exchanges may directly transmit a message that causes the nodes that receive the message to cancel any remaining reservation.

In some embodiments according to some aspects of the present invention, a LAN frame format includes, for example, a physical layer preamble followed by a physical layer header followed by a medium access control (MAC) header, followed by the frame data (e.g., the MAC body or payload).

In some embodiments according to some aspects of the present invention, at the end of a sequence of frame transmissions and/or frame exchanges sent during a period of reservation of the communication medium, a portion of a complete frame, which may be used as a Signaling frame, may be sent by the holder of the reservation that may include, for example, one or more items (e.g., one of two items). A first item may include, for example, a physical layer preamble, a physical layer header and no MAC fields. The physical layer header may indicate, for example, that the MAC portion of the frame is NULL or ZERO length. A second item may include, for example, a physical layer header only in which the physical layer header indicates that the MAC portion of the frame is NULL or ZERO length. The NULL- or ZERO-length-indicated MAC frame may signal to the node which sent the reservation confirmation message that the sending node may now send a reservation cancellation message. In some embodiments according to some aspects of the present invention, the physical layer header might not include, for example, MAC layer addressing information. The addressing may be implicit or inferred. For example, the sending node, which sent the original reservation confirmation message that is implicitly addressed by the NULL physical layer header, may send the explicit reservation cancellation frame.

Some embodiments according to some aspects of the present invention provide an IEEE 802.1 I-style wireless LAN. The Signaling frame may include, for example, (I) a physical layer Preamble and a physical layer Signal field or (2) a physical layer Signal field. The reservation cancellation message may include a ZERO-value mechanism such as, for example, a clear-to-send' (CTS) frame with a ZERO-length duration value in which the duration value is the value of the duration field of the IEEE 802.11 frame.

In some embodiments according to some aspects of the present invention, receivers of the ZERO-value mechanism such as, for example, a CTS frame with ZERO-length duration value may cancel any remaining reservation of the shared communication medium upon receipt of the reservation cancellation frame. In some embodiments according to some aspects of the present invention, receivers (e.g., in legacy stations) of the ZERO-value mechanism might not cancel the remaining reservation of the shared communication medium upon receipt of the reservation cancellation frame.

In some embodiments according to some aspects of the present invention, the receivers of a ZERO-length mechanism such as, for example, a NULL- or ZERO-length 13 frame (e.g., a physical layer Signal field or a physical layer Preamble plus a physical layer Signal field) may cancel any remaining reservation upon receipt of this signaling indication.

In some embodiments according to some aspects of the present invention, the transmission of a NULL- or ZERO-length frame may be a reservation cancellation message. If the transmission of a NULL- or ZERO-length frame is the reservation cancellation message, then no other message need be transmitted to convey the reservation cancellation message in accordance with some embodiments according to some aspects of the present invention.

Some embodiments according to some aspects of the present invention may use another mechanism to signal a reservation cancellation. The particular node, which originally sent the reservation request message and, following confirmation of the reservation, sent a sequence of frame transmissions and/or frame exchanges during a period of reservation of the medium, may terminate the sequence by sending a new reservation request message that includes a ZERO-value mechanism such as, for example, a reservation request for a duration of ZERO time. Because the reservation request message may include, for example, an explicit MAC layer address, the node sending this frame may send, if it chooses, the reservation cancellation request to any other node. It might not be necessary to send the reservation request message to the node that confirmed the earlier, non-zero reservation. In some embodiments according to some aspects of the present invention, the receipt of the ZERO-duration reservation request message may be a request to solicit the reservation cancellation message. Some embodiments according to some aspects of the present invention provide that nodes, which receive the CTS frame with ZERO-length duration value, may cancel any remaining reservation upon receipt of this reservation cancellation frame.

Some embodiments according to some aspects of the present invention provide an option such that receivers that receive the ZERO-value reservation request frame (e.g., an RTS frame as set forth in IEEE 802.11) may cancel any remaining reservation.

Some embodiments according to some aspects of the present invention provide that the transmission of the NULL- or ZERO-length frame may be the reservation cancellation message and that no other message need be transmitted.

Some embodiments according to some aspects of the present invention provide for tracking multiple reservations by their originating addresses. In some circumstances, this 14 may avoid the cancellation of outstanding reservations, for example, in adjacent wireless LANs due to, for example, interference and medium sharing. Some embodiments according to some aspects of the present invention provide that reservations can be canceled only when the cancellation message appropriately refers to the reservation holder. A reference to the reservation holder may be present, for example, only in some of the previously mentioned cancellation messages.

Some embodiments according to some aspects of the present invention provide that received reservation information from a specific RTS non-zero value reservation frame and/or received reservation information from a specific CTS non-zero value reservation may be cancelled whenever, for example, at least one of the following is received: (1) an RTS with the reservation holder indicated as the RTS sender and a zero-length duration value and (2) a CTS with the reservation holder indicated as the CTS receiver and a zero-value duration value. The reservation holder may be identified by the RTS sender address of the original reservation request message and/or by the CTS receiver address of the original reservation confirmation message.

Some embodiments according to some aspects of the present invention provide that stations, which receive an RTS reservation cancellation, rather than completely cancel the reservation time, may instead trim the reservation time to a value (e.g., a smaller value) that is sufficient to allow the reservation cancellation confirmation (e.g., a CTS frame with zero value duration) to be transmitted.

Figure 5:
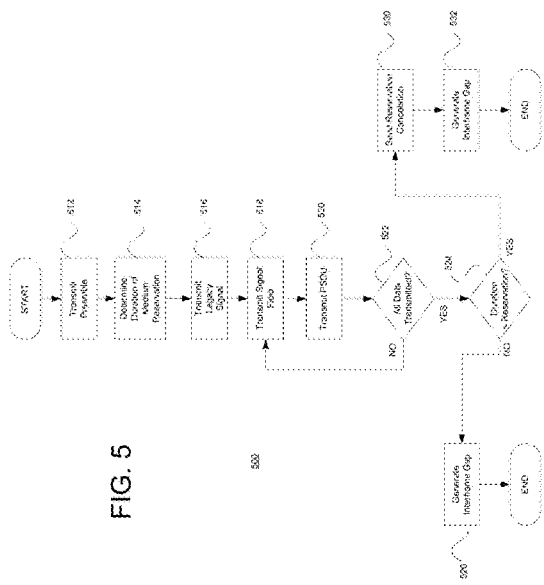
FIG. 5 shows a flowchart illustrating an embodiment of a method of operating a station that exchanges information via a shared communication medium according to some aspects of the present invention.

FIG. 5 is a flowchart illustrating an embodiment of a method of operating a station that exchanges digital information via a shared communication medium according to some aspects of the present invention. A station may be, for example, the station 110, 120. In step 512, the station may begin transmission and may transmit a Preamble portion of a backwards compatible burst transmission format (e.g., the backwards-compatible burst transmission format 400) on a shared communication medium (e.g., a shared RF communication medium 140). Although not illustrated in FIG. 5, the action of beginning to transmit may depend upon detecting that the medium is not currently occupied. In step 514, the station may determine the duration of the medium reservation that may be needed to transmit the digital information available (e.g., currently available) at the station for transmission. In step 516, the station may transmit that information as part of a Legacy Signal field in a backwards compatible burst transmission format message. In step 518 and step 520, the station then begins transmitting a Signal field and PSDU for each of the frames available for transmission. In query 522, it is determined whether the station has more data available for transmission. If more data is available for transmission, then the process jumps back to step 518 in which the station transmits the next Signal field of the backwards-compatible burst transmission format message. If no more data is available for transmission, then, in query 524, it is determined whether the transmitted data occupied the entire interval reserved by the Legacy Signal field sent earlier in the message, or reserved by the PDU-based reservation mechanism (e.g., a duration-value mechanism). If the duration of the data frames already transmitted is close enough to the duration signaled in the Legacy Signal field of the message, for example, close enough to not permit the transmission of a reservation cancellation message, then, in step 526, the station may turn off its transmitter and may generates an inter-frame gap, thereby ending the transmission of the message. If the duration of the data frames already transmitted is not close enough to the duration signaled in the Legacy Signal field of the message and, in fact, is substantially shorter than the reservation signaled earlier in the Legacy Signal field of the message, then, in step 530, the station may send a reservation cancellation message. Sending the reservation cancellation message may signal to other stations using the shared communication medium that the medium is available for use. In step 532, the station may end its use of the shared medium by turning off its transmitter and generating an Interframe Gap, thereby ending the process of transmitting the message. Some embodiments according to some aspects of the present invention provide that an Interframe Gap is not always generated or is not generated. Some embodiments according to some aspects of the present invention provide that the Interframe Gap occurs (e.g., only occurs) in the case of the use of an explicit RTS with zero duration or CTS with zero duration, rather than or in addition to the case in which the Signal field with zero length is used (in which case, the Interframe Gap might not occur).

Some embodiments according to some aspects of the present invention contemplate that the order of the steps and/or queries, for example, illustrated in and/or described in connection with, for example, FIG. 5 may be changed or that some steps and/or queries may be added and/or removed. For example, some embodiments according to some aspects of the present invention may provide that, if a reservation is transmitted within an RTS/CTS exchange, then the determination of the duration of the burst may have been performed before the transmission of any preamble. Since step 514 may cover, for example, the possibility that the duration may be a fixed value that is not necessarily based on the current amount of outstanding data, queries 524 and 522 may be reversed in order. In some embodiments according to some aspects of the present invention, it is also contemplated that the total amount of data to be transmitted may change once step 514 has occurred and thus queries 522 and 524 may be reversed in order.

Some embodiments according to some aspects of the present invention may provide a backwards-compatible burst transmission format such as, for example, the backwards compatible burst transmission format 400. Some embodiments according to some aspects of the present invention may use other types of message formats.

Some embodiments according to some aspects of the present invention may be used, for example, with one or more wireless communication media. Some embodiments according to some aspect of the present invention may be used with other type so communication media (e.g., wired communication media and wireless/wired communication media).

Some embodiments according to some aspects of the present invention may be realized in one or more of the following: hardware, software and firmware. Some embodiments according to some aspects of the present invention may be realized in a centralized fashion in at least one computer system or in a distributed fashion where different elements may be spread across several interconnected computer systems. Some embodiments according to some aspects of the present invention contemplate using any kind of computer system or other apparatus that has been adapted to carry out one or more of the systems and/or methods described herein. Some embodiments according to some aspects of the present invention contemplate using a combination of hardware and software that includes, for example, a general-purpose computer system with a computer program that, when being loaded and executed, controls the computer system such that it carries out one or more of the methods described herein.

Some embodiments according to some aspects of the present invention may be embedded in a computer program product that includes, for example, all the features enabling the implementation of one or more of the methods described herein and that, when loaded in a computer system, is able to carry out the one or more methods. In some circumstances, a computer program may be construed to mean any expression, in any language, code or notation, of a set of instructions intended to cause a system having an information processing capability to perform a particular function either directly or after either or both of the following: (1) conversion to another language, code or notation and (2) reproduction in a different material form.

This application makes reference to U.S. Provisional Patent Application Ser. No. 60/575,950 filed on Jun. 1, 2004; U.S. Provisional Patent Application Ser. No. 60/574,109 filed on May 25, 2004; and U.S. patent application Ser. No. 11/137,689, filed on May 25, 2005, entitled "Method for Combining Multiple Frames of Data into a Single Medium Access." The above-referenced applications are hereby incorporated herein by reference in their entirety.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A wireless communication device comprising:
an antenna; and
a wireless interface coupled to the antenna, the wireless interface and antenna in combination configured to:
transmit a preamble field;
transmit a legacy signal field after transmission of the preamble field, wherein the legacy signal field indicates (1) a time duration or (2) a length and a rate of a backwards-compatible burst transmission, the legacy signal field for decoding and interpretation by a second wireless device as a single frame,
transmit a plurality of paired fields after transmission of the legacy signal field, at least one paired field comprising a signal field and a service and protocol data unit field with a backwards-compatible burst transmission comprising the plurality of paired fields, and
generate an interframe gap after transmission of the plurality of paired fields.

2. The wireless device of claim 1, wherein two service and protocol data unit fields of the plurality of paired fields are encoded differently.

3. The wireless device of claim 1, wherein the plurality of paired fields are for decoding upon receipt by a burst-capable station.

4. The wireless device of claim 1, wherein the legacy signal field comprises a single legacy signal field.

5. The wireless device of claim 1, wherein the legacy signal field relates to the plurality of paired fields.

6. The wireless device of claim 1, wherein the wireless interface is configured to determine a duration of a reservation of a communication medium determined based upon interaction with a legacy station.

7. The wireless device of claim 1, wherein the interframe gap is of zero time.

8. The wireless device of claim 1, wherein the wireless interface is configured to cancel remaining reservation time when a reservation duration indicated in the legacy signal field is not substantially used.

9. The wireless device of claim 1, wherein the wireless interface is configured to trim reservation duration as indicated in the legacy signal field.

10. The wireless device of claim 1, wherein the wireless interface is configured to cancel remaining reservation time by sending a message that comprises an indication that a media access control (MAC) portion is of a NULL length or a ZERO length.

11. The wireless device of claim 1, wherein the wireless interface is configured to cancel remaining reservation time by sending a message that comprises at least one of request-to-send (RTS) frame with a ZERO-length duration value and a clear-to-send (CTS) frame with a ZERO-length duration value.

12. The wireless device of claim 11, wherein the RTS frame or the CTS frame comprises information indicates a reservation holder.

13. A wireless communication device comprising:
an antenna; and
a wireless interface coupled to the antenna, the wireless interface and antenna in combination configured to:
transmit a preamble field;
transmit a legacy signal field after transmission of the preamble field, wherein the legacy signal field indicates a length and a rate of a backwards-compatible burst transmission, the legacy signal field for decoding and interpretation by a second wireless device as a single frame,
transmit a plurality of paired fields after transmission of the legacy signal field, at least one paired field comprising a signal field and a service and protocol data unit field with a backwards-compatible burst transmission comprising the plurality of paired fields, and
generate an interframe gap after transmission of the plurality of paired fields.

14. The wireless device of claim 13, wherein two service and protocol data unit fields of the plurality of paired fields are encoded differently.

15. The wireless device of claim 13, wherein the plurality of paired fields are for decoding upon receipt by a burst-capable station.

16. The wireless device of claim 13, wherein the legacy signal field comprises a single legacy signal field.

17. A method for operating a wireless communication device comprising:
transmitting a preamble field;
transmitting a legacy signal field after transmission of the preamble field, wherein the legacy signal field indicates a length and a rate of a backwards-compatible burst transmission, the legacy signal field for decoding and interpretation by a second wireless device as a single frame,
transmitting a plurality of paired fields after transmission of the legacy signal field, at least one paired field comprising a signal field and a service and protocol data unit field with a backwards-compatible burst transmission comprising the plurality of paired fields, and
generating an interframe gap after transmission of the plurality of paired fields.

18. The method of claim 17, wherein two service and protocol data unit fields of the plurality of paired fields are encoded differently.

19. The method of claim 17, wherein the plurality of paired fields are for decoding upon receipt by a burst-capable station.

20. The method of claim 17, wherein the legacy signal field comprises a single legacy signal field.

* * * * *

UNITED STATES PATENT AND TRADEMARK OFFICE
CERTIFICATE OF CORRECTION

PATENT NO. : 8,670,427 B2
APPLICATION NO. : 13/892763
DATED : March 11, 2014
INVENTOR(S) : Matthew J. Fischer et al.

It is certified that error appears in the above-identified patent and that said Letters Patent is hereby corrected as shown below:

Title page, Related U.S. Application Data, Item (60): Replace "60/757,950" with --60/575,950--

Signed and Sealed this
Twenty-fifth Day of November, 2014

Michelle K. Lee
*Deputy Director of the United States Patent and Trademark Office*